Oct. 26, 1965　　　M. E. WALBERG　　　3,214,041
SCOOP FOR FRONT END LOADERS
Filed Nov. 6, 1963
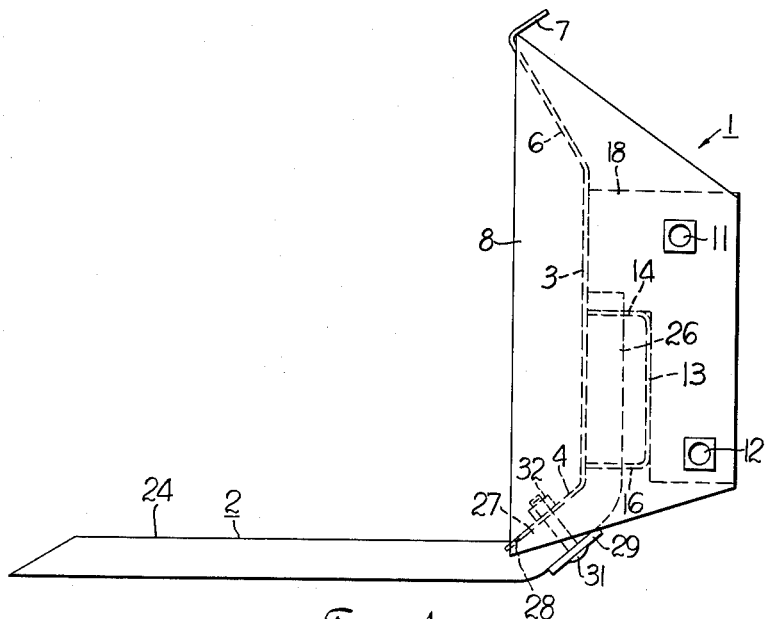
Fig. 1
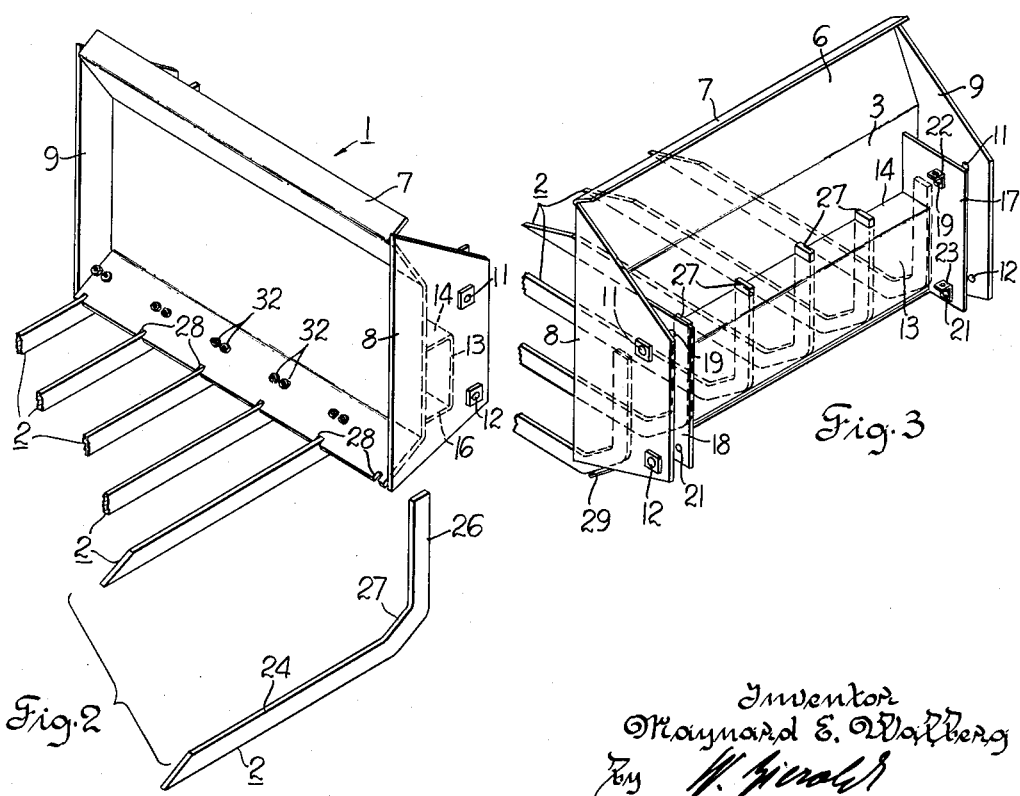
Fig. 2
Fig. 3
Inventor
Maynard E. Walberg
By W. Gerold
Attorney

United States Patent Office 3,214,041
Patented Oct. 26, 1965

3,214,041
SCOOP FOR FRONT END LOADERS
Maynard E. Walberg, West Salem, Wis., assignor to Allis-Chalmers Manufacturing Company, Milwaukee, Wis.
Filed Nov. 6, 1963, Ser. No. 321,881
5 Claims. (Cl. 214—145)

The invention relates to front end loaders and it is concerned more particularly with a front end loader for handling manure and similar material.

It has heretofore been customary to provide the scoop of a front end loader for handling manure with relatively long tines which extend forwardly from the lower edge of a material collecting bucket. When such tines are pushed into a pile of material their connections with the bucket become subject to heavy thrust loads and during the subsequent lifting of the load the tines and their connections with the bucket become further subjected to severe bending loads. Also during operation of the loader the tines are subject to abrasion and lateral loads may be incurred which tend to bend the tines sidewise.

In order to take care of these conditions, specially designed tines and special provisions for mounting them on the bucket have heretofore been suggested. However, such earlier constructions are believed to have not been entirely satisfactory, particularly in the matter of low cost of manufacture, simplicity of construction, adequate strength and efficiency of operation.

Generally, it is an object of the invention to provide an improved scoop for front end loaders which takes care of the hereinbefore mentioned conditions and requirements and which avoids the hereinbefore mentioned shortcomings of the prior art in a practical and entirely satisfactory manner.

More specifically, it is an object of the invention to provide an improved scoop for front end loaders which comprises a material collecting bucket and associated forwardly extending tines, and wherein the tines are detachably secured to the bucket in a unique manner which not only permits ready removal of the tines from and their attachment to the bucket for purposes of replacement or repair but which also lends adequate strength to the connection without causing undue drag when the scoop is moved forwardly into a pile of manure for loading.

A further object of the invention is to provide an improved loader scoop of the above outlined character incorporating a clamp type connection between the bucket and the tines which adds strength to the tines at the point of their greatest stress.

These and other objects and advantages are attained by the present invention, various novel features of which will be apparent from the description herein of a preferred embodiment of the invention and which will be pointed out in the appended claims.

In the accompanying drawings:

FIG. 1 is a side elevation of a scoop for front end loaders incorporating the invention;

FIG. 2 is a perspective front view of the scoop shown in FIG. 1, some of the tines being broken away and shown in section, and one of the tines being shown in a preparatory position for attachment to the bucket; and FIG. 3 is a perspective rear view of the scoop shown in FIG. 1, some of the tines being broken away.

The scoop shown in the drawings comprises a plate metal bucket generally designated by the reference character 1, six tine bars each generally designated by the reference character 2, and means for detachably mounting the tine bars on the bucket which will be described more fully hereinbelow.

The bucket 1 comprises a transverse plate metal member which is bent into trough shape and presents a vertical rear wall portion 3, a bottom wall portion 4 in obtuse angle relation to the rear wall portion 3, and a top wall portion 6 which extends upwardly and forwardly from the rear wall portion 3. A reinforcing flange 7 extends upwardly and rearwardly from the upper end of the front wall portion 6. Opposite end walls of the bucket 1 are afforded by plane metal plates 8 and 9 which are welded to the opposite ends, respectively, of the transverse trough presenting the rear, bottom and top walls 3, 4 and 6 of the bucket. The end plates 8 and 9 close the sides of the bucket and they extend rearwardly beyond the rear, bottom and top wall portions 3, 4 and 6. Each plate 8 and 9 has a reinforced upper pivot pin mounting hole 11 for attaching the scoop on the forward ends of a pair of up and down swingable loader arms, not shown. Each end plate 8 and 9 further has a reinforced lower pivot pin mounting hole 12 for connecting a pair of hydraulic tilting rams, not shown, of the scoop.

Extending transversely between the end plates 8 and 9 at the rear side of the rear wall portion 3 is a channel member having a vertical web 13 and relatively opposed upper and lower flanges 14 and 16. The channel member 13, 14, 16 presents an open side in facing relation to the rear side of the rear wall portion 3 of the bucket, and welds along the free longitudinal edges of the flanges 14 and 16 permanently secure the channel member to the rear of the rear wall portion 3 of the bucket. The channel member 13 14, 16 thus not only serves as a reinforcement of the bucket, but it also provides for the socketing of the tine bars 2 on the bucket, as will be apparent from FIGS. 1 and 3, and as will be explained in detail hereinbelow. Spaced inwardly from the end plate 9, as best shown in FIG. 3, is an auxiliary support plate 17 for the scoop, and a similar auxiliary support plate 18 is spaced inwardly from the end plate 8. Upper and lower pivot pin mounting holes 19 and 21 in each support plate 17, 18 register with the upper and lower pivot pin mounting holes 11 and 12, respectively, of the adjacent end plate 8 or 9. The pivot pin mounting holes 19 and 21 of each auxiliary support plate 17, 18 are reinforced at the inner side of the plate by angle clips 22 and 23, respectively. Cotter pins, not shown, may be installed on the angle clips for securing pivot pins, not shown, in registering pairs of pivot pin mounting holes. The auxiliary support plates 17, 18 are cut out to fit over the channel member 13, 14, 16, as best shown in FIG. 1. The support plates 17, 18 are secured in place by welding to the rear of the rear wall portion 3 and by welding to the top flange 14 and web 13 of the channel member.

The tine bars 2 are each shaped as illustrated by the detached tine bar shown in FIG. 2. They are made of rectangular bar stock which is bent edgewise so as to present a material engaging finger portion 24 of greater height than width, a rear leg portion 26 in upstanding relation to the finger portion and an intermediate portion 27 between the finger and leg portions. The intermediate and rear leg portions 27 and 26 are disposed in substantially the same obtuse angle relation to each other as the rear wall portion 3 and the bottom wall portion 4 of the bucket. As best shown in FIGS. 1 and 2, the material engaging finger portion 24 and the upstanding rear leg portion 26 of each tine bar 2 are disposed in a common plane and in substantially right angle relation to each other. The front edge of the material engaging finger portion 24 is forwardly and downwardly inclined to provide a material penetrating point near the lower edge of the finger portion.

In order to socket the tine bars 2 on the bucket 1 the upper and lower flanges 14 and 16 of the channel member in rear of the rear wall portion 3 are provided with pairs of registering rectangular apertures, one pair for the rear leg of each tine bar. The width and length of each rectangular aperture in the flanges 14 and 16 correspond to the width and length of the cross sectional profile of the tine bar stock, the rectangular apertures being slightly oversize so that the rear legs of the tine bars may readily be inserted into a registering pair of apertures by upward movement of the tine bar from the preparatory position in which one of the tine bars is shown in FIG. 2. Such upward movement of the tine bar toward the bucket will cause the rear leg of the tine bar to move into a pair of registering apertures of the channel member until the upper edge of the intermediate tine bar portion 27 abuts against the underside of the bucket bottom wall 4. Re-entrant notches 28 are formed along the forward lower edge of the bottom wall 4, and in the assembled condition of the scoop, each finger portion 24 is straddled by a notch 28. However, as best shown in FIG. 1, the bottom wall 4 of the scoop terminates above the bottom plane of the finger portions 24.

The tine bars 2 are releasably secured to the bucket 1 by clamping means comprising a retainer bar 29, bolts 31 and associated nuts 32. The retainer bar 29 is made of rectangular bar stock and has a length substantially equal to the transverse width of the bucket so that it may span the entire row of tine bars which are socketed in the channel member 14, 16, 13 and which are straddled by the notches 28. The intermediate portion 27 of each tine bar 2 presents an elongated bottom edge which extends upwardly and rearwardly from the bottom edge of the finger portion 24. In the assembled condition of the scoop the retainer bar 29 underlies the intermediate portions 27 of the tine bars 2, and it is drawn up against the rearwardly and upwardly inclined bottom edges of the intermediate tine bar portions 27 by pairs of bolts 31 and nuts 32 thereon, one pair of bolts for each tine bar. The bolts 31 are preferably carriage bolts, and the retainer bar 29 has square holes matching the square shank portions of the carriage bolts. The threaded portions of the bolts extend through paired holes in the bottom wall portion 4 of the bucket, the paired holes for the bolts being arranged in such relation to the notches 28 that each intermediate tine bar portion 27 will be straddled by a pair of connecting bolts between the bucket bottom wall 4 and the retainer bar 29.

In operation, when the scoop is moved forward into a pile of material such as manure, practically no resistance to the filling of the bucket will be caused by the retainer bar 29. This result is due to the fact that the bar is positioned generally in trailing relation to the bottom wall portion 4 of the bucket, and its lower edge does not project downwardly beyond the bottom plane of the material engaging finger portions 24. Engagement of the retainer bar 29 with the intermediate tine bar portions 27 moreover ties all the tine bars together so that one supports the other, and section is added to the tines at their areas of maximum stress.

It should be understood that it is not intended to limit the invention to the details of construction herein shown and described, and that the invention includes such other forms and modifications as are embraced by the scope of the appended claims.

The embodiments of the invention in which an exclusive property or privilege is claimed are defined as follows:

1. In a scoop for loaders, the combination of a plate metal bucket having a rear wall, transversely spaced side walls and a bottom wall in obtuse angle relation to said rear wall; a series of tine bars made of rectangular bar stock bent edgewise to present material engaging finger portions of greater height than width, rear leg portions in upstanding relation to said finger portions, and intermediate portions between said finger and leg portions at substantially the same obtuse angle relation to said leg portion as said rear and bottom walls; and socket means secured to the rear side of said rear wall and cooperatively engageable with said rear legs by upward movement of said tine bars relative to said bucket for positioning said rear leg portions and said intermediate portions in parallel contact relation with said rear wall and bottom wall, respectively.

2. The combination set forth in claim 1 including a retainer bar underlying said intermediate leg portions of said tine bars and above the bottom portion of said tines and extending transversely from one side wall of said scoop to the other; and fastening means in cooperative engagement with said bucket bottom and with said retainer bar for securing said intermediate leg portions of said tine bars to the underside of said bucket bottom wall.

3. A scoop as set forth in claim 2 wherein said fastening means comprises pairs of connecting bolts between said bucket bottom wall and said retainer bar in close straddling relation to said intermediate leg portions, respectively, of said tine bars.

4. The combination set forth in claim 2 wherein said bottom wall of said plate metal bucket has a series of reentrant recesses at its free end in straddling relation to said finger portions of said tine bars.

5. The combination set forth in claim 1, wherein said socket means comprises a channel member extending between said side walls and having a series of relatively opposed apertures in its flanges for the reception of said rear leg portions of said tines, said channel member being secured to said bucket rear wall in a position presenting the open side of said channel member in facing relation to the rear side of said rear wall.

References Cited by the Examiner
UNITED STATES PATENTS

| | | |
|---|---|---|
| 819,090 | 5/06 | Smith et al. |
| 967,892 | 8/10 | Ehlers _____ 294—122 X |
| 1,396,355 | 11/21 | Chicione. |
| 1,573,137 | 2/26 | Brannow. |
| 2,081,192 | 5/37 | Allin et al. |
| 2,612,280 | 9/52 | Stueland _____ 214—145 |

HUGO O. SCHULZ, *Primary Examiner.*